Aug. 16, 1949.　　　　　O. J. CERNY　　　　2,479,099
CARRYING TRUCK FOR DISK CULTIVATORS
Filed Oct. 28, 1947　　　　　　　　　　2 Sheets-Sheet 1

INVENTOR.
Oswald J. Cerny

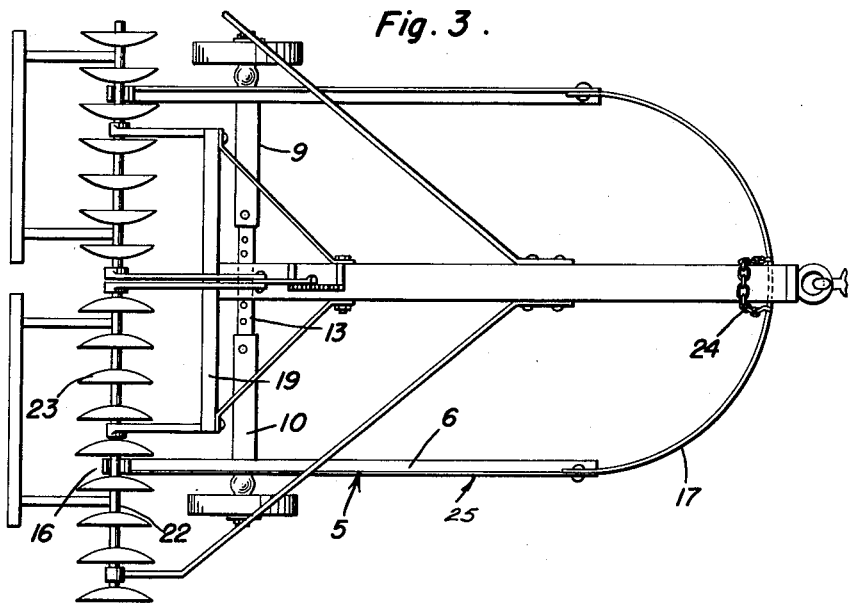
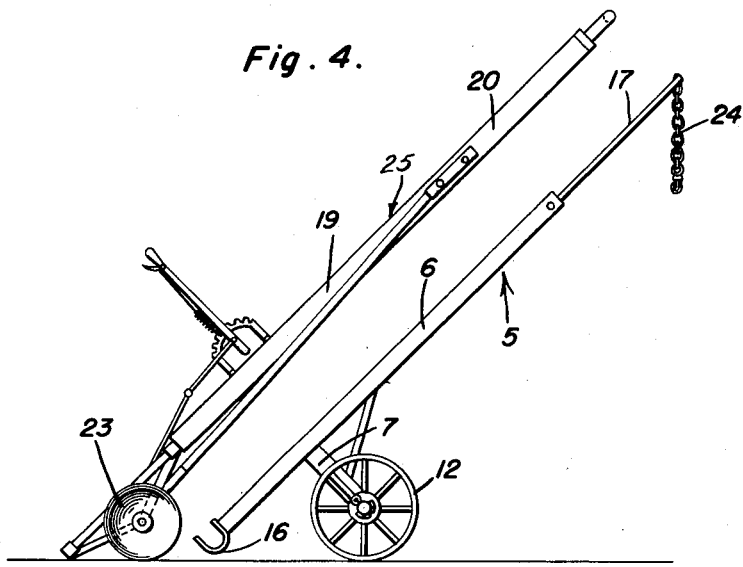

Patented Aug. 16, 1949

2,479,099

UNITED STATES PATENT OFFICE 2,479,099

CARRYING TRUCK FOR DISK CULTIVATORS

Oswald J. Cerny, Osceola, Nebr.

Application October 28, 1947, Serial No. 782,501

1 Claim. (Cl. 280—35)

The present invention relates to new and useful improvements in carrying trucks for agricultural implements, such as disk cultivators or the like for enabling the implement to be transported from place to place when not in use.

An important object of the invention is to provide a carrying truck of this character in which a disk cutivator may be placed in position or removed from the truck with a minimum of manual effort.

A further object of the invention is to provide means for adjusting the width of the truck frame whereby the saddles carried at the rear end of the frame may be properly positioned for placing between the disks of the cultivator so that the shaft thereof will seat in the saddle.

A still further object is to provide a device of this character of simple and practical construction, which is strong and durable, efficient and reliable in operation, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which—

Figure 3 is a top plan view, and;

Figure 4 is a side elevational view showing the truck in position for mounting a disk harrow thereon.

Figure 1:
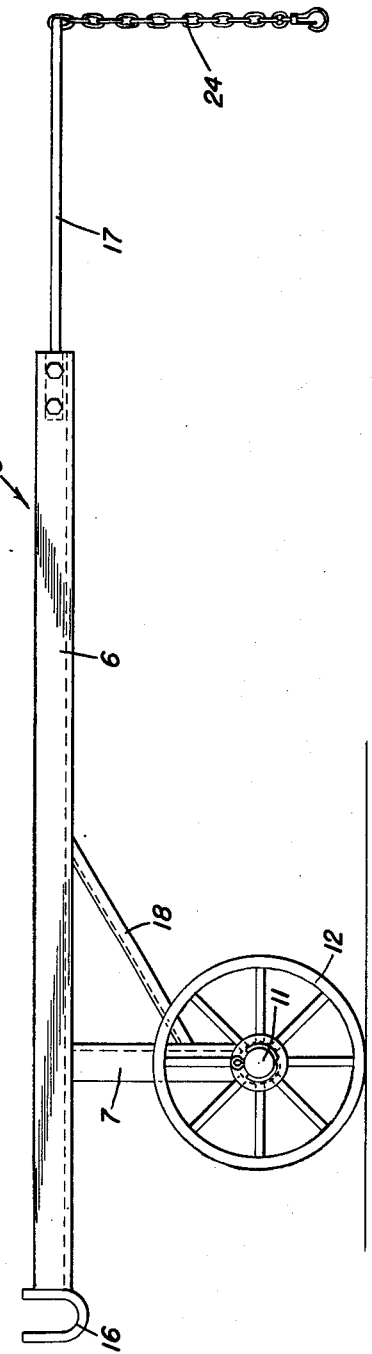
Figure 1 is a side elevational view.
Figure 2:
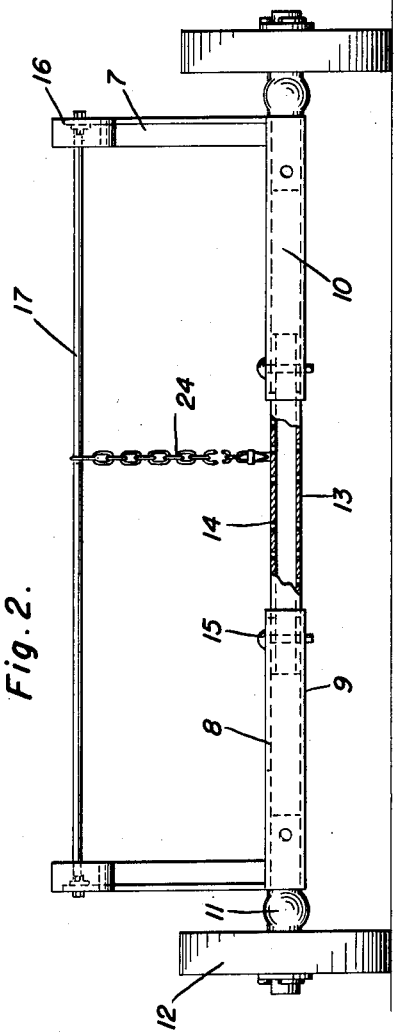
Figure 2 is a rear elevational view and with parts broken away and shown in section to show the adjustable axle for the truck.

Referring now to the drawings in detail wherein for the purpose of illustration I have disclosed a preferred embodiment of the invention the numeral 5 designates the truck main frame generally and which includes a pair of longitudinal frame members 6, preferably of angle iron construction and supported adjacent their rear ends on posts 7 rising from the outer ends of a hollow axle 8.

The axle 8 includes a pair of end sections 9 and 10 in the outer ends of which stub axles 11 are secured and on which the wheels 12 are journaled. The inner ends of the axle sections 9 and 10 telescope over the ends of a central axle section 13 having longitudinally spaced openings 14 extending therethrough for receiving pins 15 to secure the sections of the axle to each other for adjusting the width of the frame 5.

U-shaped saddles 16 are welded or otherwise suitably secured to the rear end of the frame member 6 and the front ends of the frame member 6 are connected by an arcuate or bowed rod 17 of bendable material.

Braces 18 extend from the posts 7 to the frame member 6.

In the operation of the device a disk harrow 19 of conventional construction is raised by a tongue 20 in an inclined position as shown in Figure 4 of the drawings and the front end of the frame 5 is likewise raised into a position substantially parallel with the tongue 20 and backed under the harrow so that the shaft 22 of the harrow will be seated in the saddles 16 at the rear end of the frame member 6. The width of the frame 5 of the truck is adjusted by means of the telescoping engagement of the sections 9 and 10 of the axle over the central section 13 thereof so that the saddles 16 will properly enter between a pair of the disks 23 of the harrow to prevent interference of the disks with the seating of the shaft 22 in the saddles 16.

The frame 25 and tongue 20 of the harrow are then lowered and the tongue 20 is secured on top of the bowed front connector 17 by a chain 24 carried by the bowed member.

The tongue 20 of the harrow may then be attached to a trailer and the harrow then transported to or from a field on the truck 5.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described the invention, what is claimed as new is:

A carrying truck of the class described comprising a frame including a pair of longitudinal frame members, an extensible axle supporting the frame for adjustment of said longitudinal frame members relative to each other, a bendable bow shaped connector for the front ends of said frame members, self-adjustable with the frame members, and saddles at the rear end of said frame members for supporting an object thereon.

OSWALD J. CERNY.

(References on following page)

REFERENCES CITED

The following references are of record in the file of this patent:

UNITED STATES PATENTS

| Number | Name | Date |
|---|---|---|
| 461,689 | Sherman | Oct. 20, 1891 |
| 760,708 | Sharp | May 24, 1904 |
| 1,122,805 | Schertz | Dec. 29, 1914 |
| 2,287,955 | Zunino | June 30, 1942 |

FOREIGN PATENTS

| Number | Country | Date |
|---|---|---|
| 354,373 | Germany | June 10, 1922 |